United States Patent
Yim

(10) Patent No.: US 7,688,019 B2
(45) Date of Patent: Mar. 30, 2010

(54) METHOD AND SYSTEM FOR COMPENSATING FOR POSITION ERROR OF STEP MOTOR

(75) Inventor: Choong-Hyuk Yim, Seoul (KR)

(73) Assignee: Convex Co., Ltd. (KR)

( * ) Notice: Subject to any disclaimer, the term of this patent is extended or adjusted under 35 U.S.C. 154(b) by 317 days.

(21) Appl. No.: 11/823,398

(22) Filed: Jun. 27, 2007

(65) Prior Publication Data

US 2008/0265824 A1    Oct. 30, 2008

(30) Foreign Application Priority Data

Apr. 30, 2007    (KR) .................... 10-2007-0042168

(51) Int. Cl.
*G05B 19/40* (2006.01)
(52) U.S. Cl. .................. 318/685; 318/671; 318/686; 360/75; 360/77.02; 360/77.04
(58) Field of Classification Search ............. 318/685, 318/671, 686; 360/75, 77.02, 77.04
See application file for complete search history.

(56) References Cited

U.S. PATENT DOCUMENTS

| 4,504,772 | A | * | 3/1985 | Matsuura et al. ............ 318/603 |
| 4,999,558 | A | * | 3/1991 | Onodera et al. ............. 318/685 |
| 5,187,417 | A | * | 2/1993 | Minnich et al. ........ 318/400.12 |
| 5,469,215 | A | * | 11/1995 | Nashiki ...................... 318/432 |
| 5,844,394 | A | * | 12/1998 | Mushika et al. ............. 318/696 |
| 6,195,220 | B1 | * | 2/2001 | Ellis et al. ................ 360/77.08 |
| 6,222,340 | B1 | * | 4/2001 | Kawabata et al. ........... 318/685 |
| 6,469,849 | B1 | * | 10/2002 | Ellis et al. ..................... 360/29 |
| 6,555,985 | B1 | * | 4/2003 | Kawabata et al. ........... 318/685 |
| 7,023,170 | B2 | * | 4/2006 | Yasukawa et al. ........... 318/799 |
| 7,504,795 | B2 | * | 3/2009 | Takaishi ..................... 318/652 |

FOREIGN PATENT DOCUMENTS

| JP | 11252994 | 9/1999 |
| KR | 1020050042703 A | 5/2005 |

\* cited by examiner

*Primary Examiner*—Rita Leykin
(74) *Attorney, Agent, or Firm*—Cantor Colburn LLP

(57) ABSTRACT

The present invention relates to a method and a system for compensating for a position error of a step motor. A method for compensating for a position error of a step motor includes: sequentially inputting a predetermined number of a pulse as a rotator position command to a step motor driver; driving a step motor in a micro step method based on the rotator position command and a predetermined current command table; detecting an actual position of a rotator of the step motor while the step motor is being driven; calculating a position error by comparing the rotator position command and the detected actual position of the rotator; and compensating for the predetermined current command table based on the calculated position error. According to the present invention, a position error which may occur when the step motor is driven by a micro step method can be removed.

7 Claims, 2 Drawing Sheets

METHOD AND SYSTEM FOR COMPENSATING FOR POSITION ERROR OF STEP MOTOR

CROSS-REFERENCE TO RELATED APPLICATION

This application claims priority to and the benefit of Korean Patent Application No. 10-2007-0042168 filed in the Korean Intellectual Property Office on Apr. 30, 2007, the entire contents of which are incorporated herein by reference.

BACKGROUND OF THE INVENTION (a) Field of the Invention

The present invention relates to a method and a system for compensating for a position error of a step motor.

(b) Description of the Related Art

A step motor can be controlled at an even rotation angle through a simple control circuit even though a resolution is low, and can perform a highly precise position control even without an expensive position sensor. Due to these advantages, the step motor is widely used to computer peripherals, a video tape recorder (VTR), an X-Y table, a semiconductor device, a direction control device of a security camera, or the like.

The step motor has been generally controlled by a basic angle control method which is referred to as a full step control method or a half step control method. According to the basic angle control method, the step motor rotates by a step angle, i.e., 1.8° or 0.9° per one input pulse. Since the step motor rotates by the step angle which is a relatively great angle, a small vibration occurs at every rotation at a low speed so that the motor cannot smoothly rotate, and this small vibration at a low and a medium speed can cause a shaft vibration to increase as high as the motor cannot rotate (stall phenomenon).

In order to solve such drawbacks of the basic angle control method, a micro step control method has been introduced. The micro step control method is a method of driving the step motor in a smaller angle (micro step) than the step angle, that is, a method of controlling the step motor with an increased resolution of the rotating angle. The increased resolution of the rotating angle by the micro step control method may decrease the noise and the vibration at a low speed, and hence the stall of the motor can be prevented.

However, to increase the resolution of the rotating angle of the motor by the micro step driving is not to enhance the preciseness of the rotating angle of the motor. That is, whether the step motor actually precisely rotates by a very small angle during the micro step driving, that is, the preciseness of the rotating angle, is different from the resolution of the rotating angle of the motor.

For example, if the conventional step motor is driven by a full step with the step angle of 1.8°, the motor rotates by 1.8° per one pulse of a rotation command, and rotates by 0.9° at the half step driving. On the other hand, according to the micro step driving, the motor rotates by 360/25000(=0.0144)° per one rotation command so as to enhance the resolution. However, the step motor intrinsically has the possibility of a position error, and generally has a position error of about ±5% even in case of the micro step driving. In case that a particularly precise position control is required, the position error of ±5% is not negligible.

SUMMARY OF THE INVENTION

The present invention has been made in an effort to provide a method and a system for compensating for a position error of a step motor having an advantage of enhancing the preciseness of a rotating angle of a motor.

An exemplary embodiment of the present invention provides a method for compensating for a position error of a step motor including: sequentially inputting a predetermined number of a pulse as a rotator position command to a step motor driver; driving a step motor in a micro step method based on the rotator position command and a predetermined current command table; detecting an actual position of a rotator of the step motor while the step motor is being driven; calculating a position error by comparing the rotator position command and the detected actual position of the rotator; and compensating for the predetermined current command table based on the calculated position error.

The compensating for the current command table may use a linear interpolation method.

The compensated current command table may be obtained by Equation;

$$\overline{f}[k] = f[k] - \frac{f[k] - f[k-1]}{\theta[k] - \theta[k-1]} \Delta\theta[k], \quad k = 1, 2, \cdots, M$$

$$\overline{g}[k] = g[k] - \frac{g[k] - g[k-1]}{\theta[k] - \theta[k-1]} \Delta\theta[k], \quad k = 1, 2, \cdots, M$$

where $\overline{f}[k]$ and $\overline{g}[k]$ are current command data which are included in the compensated current command table, $f[k]$ and $g[k]$ are current command data which are included in the current command table before the compensation, $\theta[k]$ is an actual position of the rotator, $\Delta\theta[k]$ is the calculated position error, and M is the number of micro steps corresponding to one cycle of an electrical angle of the step motor.

The current command table may have current command data for rotating the step motor at divided M micro steps, and the predetermined number of the pulses may be more than or equal to the number M.

An exemplary embodiment of the present invention provides a system for compensating for a position error of a step motor including: an encoder detecting an actual position of a rotator of the step motor while a step motor driver which is sequentially inputted with a predetermined number of a pulse as a rotator position command drives the step motor in a micro step method based on a predetermined current command table; and a compensator calculating a position error by comparing the detected actual position of the rotator and a position command to which the rotator of the step motor moves according to the predetermined current command table and compensating for the predetermined current command table using the calculated position error.

The system may further include a motion controller inputting the rotator position command to the step motor driver.

An exemplary embodiment of the present invention provides a step motor system including: a step motor; and a step motor driver storing a first current command table and driving the step motor in a micro step method based on the first current command table at every time when an input pulse is inputted from an outside as a rotator position command. The first current command table is obtained by compensating for a second current command table using a position error which is calculated by comparing an actual position of a rotator of the step motor and the rotator position command while the step motor driver which is sequentially inputted with a predetermined number of a pulse as the rotator position command drives the step motor in a micro step method based on the second current command table.

DESCRIPTION OF REFERENCE NUMERALS INDICATING PRIMARY ELEMENTS IN THE DRAWINGS

| 110: motion controller | 120: encoder |
|---|---|
| 130: compensator | 210: step motor driver |
| 220: step motor | |

DETAILED DESCRIPTION OF THE EMBODIMENTS

Exemplary embodiments of the present invention will hereinafter be described in detail with reference to the drawings.

Figure 1:
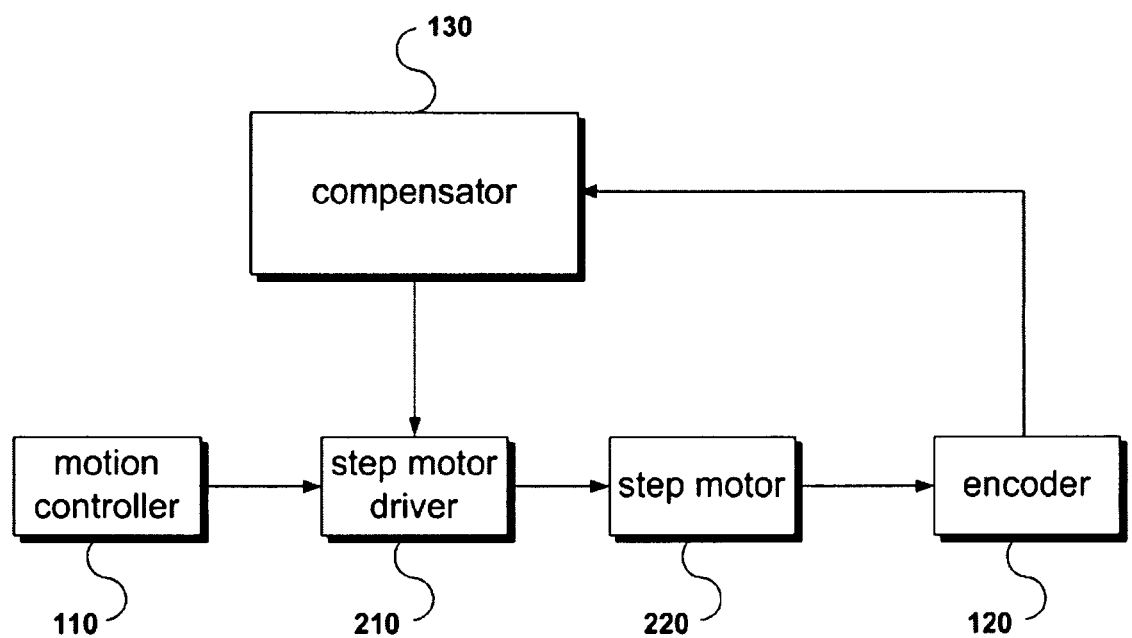
FIG. 1 is a block diagram showing a system for compensating for a position error of a step motor according to an exemplary embodiment of the present invention.

FIG. 1 is a block diagram showing a system for compensating for a position error of a step motor according to an exemplary embodiment of the present invention.

Referring to FIG. 1, a system for compensating for a position error of a step motor (hereinafter referred to as a step motor compensation system) includes a motion controller 110, an encoder 120, and a compensator 130, and is connected to a step motor 220 and a step motor driver 210 so as to be able to send and receive various signals and data.

The step motor 220 is driven in a micro step method according to a phase current of a sinusoidal wave form which is applied from the step motor driver 210.

The step motor driver 210 stores a current command table at a memory (not shown), and sequentially reads current command data from the current command table at every point at which an input pulse is inputted from an external device (not shown) or the motion controller 110 and thereby produces a current command. In addition, the step motor driver 210 controls respective phase currents so as to precisely follow the current command, and applies the same at respective phases of the step motor 220, thereby driving the step motor 220 in a micro step method.

The motion controller 110 sequentially inputs N pulses to the step motor driver 210 as a position command θ* so as to make the step motor 220 be driven.

The encoder 120 is connected to a rotator (not shown) of the step motor 220 to detect an actual position θ of the rotator, and transmits the same to the compensator 130. For example, the encoder 120 may be a rotary sensor.

The compensator 130 calculates a position error Δθ by comparing the actual position θ of the rotator detected by the encoder 120 with the position command θ* to which the rotator of the step motor 220 theoretically moves, and compensates for the current command data through a linear interpolation method using the calculated position error Δθ. The compensator 130 may be realized as a terminal having a memory and a microprocessor to have a calculation capability such as a laptop computer, a work station, or a palmtop computer.

The step motor 220 which is driven in a micro step control method will be explained in more detail hereinafter. Here, the explanation will be made for the exemplary case that the step motor 220 is a two-phase hybrid step motor.

The produced torque $T_e$ of the two-phase hybrid step motor 220 can be set in the following Equation 1.

$$\tau_e(i_a, i_b, \theta) = K_T\{-\sin(N_r\theta)i_a + \cos(N_r\theta)i_b\}$$  [Equation 1]

where $i_a$ is an a-phase current, $i_b$ is a b-phase current, $\theta$ is a mechanical angle (position) of the rotator, $K_T$ is a torque constant, and $N_r$ is the number of teeth of the rotator.

Current commands for the a-phase and the b-phase of the step motor 220 can be selected as sinusoidal wave forms defined as the following Equation 2.

$$i_a^* = I_m\cos(N_r\theta^*), i_b^* = I_m\sin(N_r\theta^*)$$  [Equation 2]

where $i_a^*$ is an a-phase current command, $i_b^*$ is a b-phase current command, and $\theta^*$ is a rotator position command.

If it is assumed that the respective phase currents $i_a$ and $i_b$ are properly controlled by a current controller of the step motor driver 210, the phase currents $i_a$ and $i_b$ which are applied at respective phases of the step motor by the current commands $i_a^*$ and $i_b^*$ are as in the following Equation 3.

$$i_a = i_a^*, i_b = i_b^*$$  [Equation 3]

Accordingly, the produced torque $T_e$ of the two-phase hybrid step motor 220 during the micro step driving is defined as in the following Equation 4 from the Equations 1, 2, and 3.

$$\begin{aligned}\tau_e &= K_T I_m\{-\sin(N_r\theta)\cos(N_r\theta^*) + \cos(N_r\theta)\sin(N_r\theta^*)\} \\ &= -K_T I_m \sin(N_r(\theta - \theta^*))\end{aligned}$$  [Equation 4]

Accordingly, an equilibrium position $\theta_{eq}$ at which the produced torque $T_e$ becomes 0 is $\theta^*$ or $\theta^* + \pi/N_r$.

In case that $\theta_{eq}$ is $\theta^*$, the following Equation 5 is satisfied, and in case that $\theta_{eq}$ is $\theta^* + \pi/N_r$, the following Equation 6 is satisfied.

$$\frac{d\tau_e}{d\theta} = -K_T I_m N_r \cos(N_r(\theta - \theta^*)) < 0, \quad \text{if} \quad -\frac{\pi}{2N_r} + \theta_{eq} \leq \theta \leq \theta_{eq} + \frac{\pi}{2N_r}$$  [Equation 5]

$$\frac{d\tau_e}{d\theta} = -K_T I_m N_r \cos(N_r(\theta - \theta^*)) > 0, \quad \text{if} \quad -\frac{\pi}{2N_r} + \theta_{eq} \leq \theta \leq \theta_{eq} + \frac{\pi}{2N_r}$$  [Equation 6]

Accordingly, referring to Equations 5 and 6, the stable equilibrium position among the equilibrium positions $\theta_{eq}$ is $\theta^*$. That is, when the step motor 220 is driven in the micro step method, the position of the rotator of the step motor 220 can be controlled to coincide with the position command $\theta^*$. Accordingly, if the respective phase currents $i_a$ and $i_b$ of the step motor 220 are controlled as in the Equation 2, the position $\theta$ of the rotator can be controlled to coincide with an arbitrary position command $\theta^*$.

A method for actually driving the step motor 220 based on the micro step driving will be explained hereinafter.

The step motor driver 210 stores a current command table at a memory (not shown), and sequentially reads current command data from the current command table at every point k at which an input pulse is inputted from the outside and thereby produces a current command.

For example, the step motor driver 210 stores the current command table having current command data of a sine (sin) wave form or a cosine (cos) wave form which are respectively comprised of M data as in Equation 7 at a memory, and sequentially reads the current command data from the current command table at every point k at which an input pulse is inputted from the outside and thereby produces a current command. The current command table is configured to rotate the step motor 220 at the divided M micro steps for one cycle of an electrical angle. That is, M is the number of the micro steps (resolution) corresponding to one cycle of the electrical angle of the step motor 220.

$$f[k] = I_m \cos[2\pi(k-1)/M], k=1,2,\ldots,M$$

$$g[k] = I_m \sin[2\pi(k-1)/M], k=1,2,\ldots,M \quad \text{[Equation 7]}$$

where f[k] and g[k] are respectively data values corresponding to the current commands for the a-phase and the b-phase of the step motor 220.

Accordingly, the step angle $\theta_{sa}$ in the micro step driving is as in Equation 8.

$$\theta_{sa} = \frac{2\pi}{N_r M} \quad \text{[Equation 8]}$$

Meanwhile, in case that N pulses are inputted as position commands, the step motor driver 220 sequentially reads the current command data from the current command table at every point k at which an input pulse is inputted and thereby produces the current commands for the respective phases as in Equation 9. The position command denotes the command for the position to which the step motor 220 should move.

$$i_a^*[k] = f[(k-1)\%M+1] \; i_b^*[k] = g[(k-1)\%M+1], k=1,2,\ldots,N \quad \text{[Equation 9]}$$

where % are remaining operators.

Accordingly, the position command $\theta^*[k]$ at the point when the k-th pulse is inputted is as in Equation 10, and the position command $\theta^*[N]$ at the point when the final N-th pulse is inputted is as in Equation 11.

$$\theta^*[k] = \frac{2\pi}{N_r} \frac{k}{M}, \quad k=1,2,\ldots,N \quad \text{[Equation 10]}$$

$$\theta^*[N] = \frac{2\pi}{N_r} \frac{N}{M} \quad \text{[Equation 11]}$$

As explained above, if the a-phase current and the b-phase current are controlled to precisely follow the current commands $i_a^*[k]$ and $i_b^*[k]$, the actual position $\theta[k]$ of the rotator can be controlled to precisely coincide with the position command $\theta^*[k]$.

Figure 2:
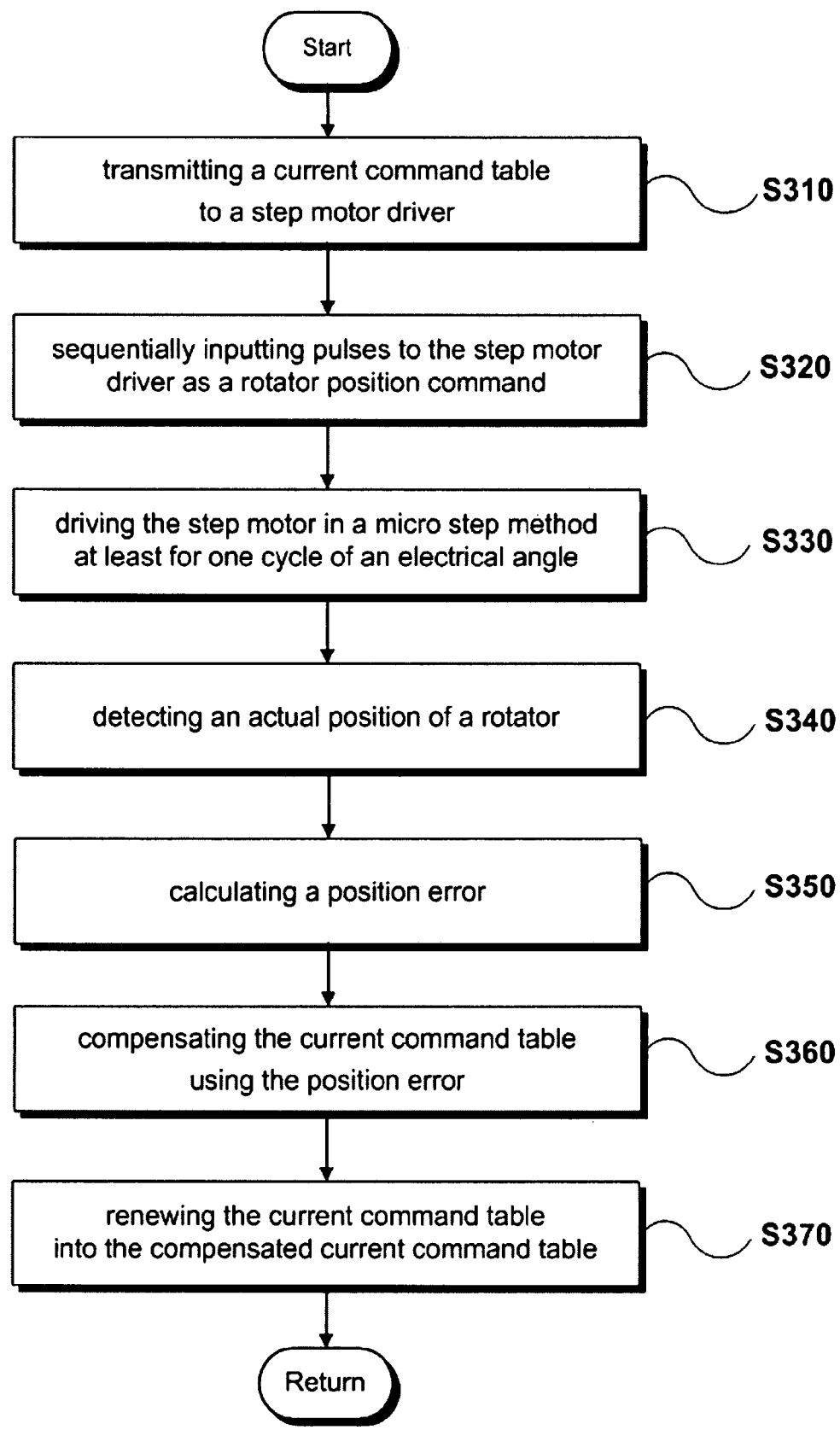
FIG. 2 is a flowchart for explaining operations of a system for compensating for a position error of a step motor according to an exemplary embodiment of the present invention.

With reference to FIG. 2, a method for compensating for a position error for the step motor 220 and the step motor driver 210 as such will be explained in detail hereinafter.

FIG. 2 is a flowchart for explaining operations of a system for compensating for a position error of a step motor according to an exemplary embodiment of the present invention.

Referring to FIG. 2, a current command table, which is prepared in advance, is transmitted to the step motor driver 210 and is stored to the same at step S310. The current command table which is transmitted at step S310 is a table before compensation where the position error $\Delta\theta$ is not considered and is theoretically obtained from the Equation 7.

Subsequently, the motion controller 110 sequentially inputs N pulses to the step motor driver 210 as the position command $\theta^*[k]$ of the rotator at step S320, thereby allowing the step motor driver 210 to drive the step motor 220 in the micro step method based on the current command table transmitted from the compensator 130 at step S330. At this time, the number N of the input pulses is preferable to be greater than or equal to the resolution M so as to sufficiently obtain the position error $\Delta\theta$, and accordingly the step motor 220 is driven at least for one cycle of the electrical angle.

Subsequently, while the step motor 220 is driven, the encoder 120 detects the actual position of the rotator and transmits the same to the compensator 130 at step S340.

The compensator 130, at step S350, calculates the position error $\Delta\theta$ by comparing the actual position $\theta[k]$ of the rotator which is detected by the encoder 120 with the position command $\theta^*[k]$ to which the rotator theoretically moves according to the current command table provided to the step motor 130.

The compensator 130 compensates for the current command table as in Equation 12 though the linear interpolation using the calculated position error $\Delta\theta$. The position command $\theta^*[k]$ which is used for the calculation of the position error $\Delta\theta$ may be the value which is theoretically calculated according to the Equation 10.

$$\bar{f}[k] = f[k] - \frac{f[k] - f[k-1]}{\theta[k] - \theta[k-1]} \Delta\theta[k], \quad k=1, 2, \ldots, M \quad \text{[Equation 12]}$$

$$\bar{g}[k] = g[k] - \frac{g[k] - g[k-1]}{\theta[k] - \theta[k-1]} \Delta\theta[k], \quad k=1, 2, \ldots, M$$

Finally, at step S370, the compensator 130 renews the current command table which is stored in the memory of the step motor driver 210 into the compensated current command table according to the Equation 12.

The step motor driver 210 having the compensated current command table as such can drive the step motor 220 without a position error.

Further detailed explanation for the same will be made. If the produced torque $T_e$ of the two-phase hybrid step motor 220 has the ideal sinusoidal wave form as in the Equation 1, the actual position $\theta(k)$ of the rotator may be controlled to precisely coincide with the command position $\theta^*(k)$ without an error when the current command as in the Equation 2 is used. However, the produced torque $T_e$ of the most actual two-phase hybrid step motor 220 includes harmonic components rather than the ideal sinusoidal wave form as in the Equation 1. Accordingly, the produced torque $T_e$ of the more actual two-phase hybrid step motor 220 is as in Equation 13.

$$\tau_e(i_a, i_b, \theta) = K_T\{-T(N_r\theta)i_a + T(N_r\theta + \pi/2)i_b\} \quad \text{[Equation 13]}$$

where $T(N_r\theta)$ is a cyclic function of a cycle of $2\pi$ and may be described as a sum of a basic frequency component $\sin(N_r\theta)$ and a harmonic component $H(N_r\theta)$ as in Equation 14.

$$T(N_r,\theta)=\sin(N_r,\theta)+H(N_r,\theta)$$

$$H(N_r,\theta)=c_2\sin(2N_r,\theta)+c_3\sin(3N_r,\theta)+ \quad \text{[Equation 14]}$$

If it is assumed that the current commands of the a-phase and the b-phase of the step motor are selected as the sinusoidal wave form as in the Equation 2 and the current control is properly performed, the produced torque $T_e$ by the Equations 2, 3, 13, and 14 is calculated as in Equation 15.

$$\tau_e = K_T I_m\{-T(N_r\theta)\cos(N_r\theta^*) + T(N_r\theta + \pi/2)\sin(N_r\theta^*)\} \quad \text{[Equation 15]}$$
$$= -K_T I_m \sin(N_r(\theta-\theta^*)) + G(N_r\theta, N_r\theta^*)$$

where the relation of $$G(N_r,\theta, N_r\theta^*)=K_T I_m\{-H(N_r\theta)\cos(N_r\theta)+H(N_r\theta+\pi/2)\sin(N_r\theta^*)\}$$

exists.

As can be known from the Equation 15, since the equilibrium position $\theta_{eq}$ where the produced torque becomes 0 is not $\theta^*$ because of $G(N_r,\theta,N_r\theta^*)$, a position error $\Delta\theta$ between the actual position $\theta[k]$ of the rotator and the position command $\theta^*[k]$ occurs.

However, as in an embodiment of the present invention, according to the step motor driver 210 having the current command table which is compensated in consideration of the position error $\Delta\theta$ and the step motor 220, the step motor can be driven without the position error $\Delta\theta$ which is produced by the harmonic components included to the produced torque. In addition, deviations of the step motor 220 and the step motor driver 210 can be removed.

Accordingly, since the step motor driver 210 and the step motor 220 which are formed by the method and the system for compensating for the position error of the step motor according to embodiments of the present invention include the compensated current command table, the position of the step motor 220 can be highly precisely controlled even without a separate sensor.

The method according to an embodiment of the present invention can be embodied as computer readable codes on a computer readable recording medium. The computer readable recording medium can be any data storage device that can store data which can be thereafter read by a computer. Examples of the computer readable recording medium include read-only memory (ROM), random-access memory (RAM), CD-ROMs, floptical disks, magnetic tapes, floppy disks, optical data storage devices, and carrier waves (i.e., transmission through the Internet). The computer readable recording medium can also be distributed over a network coupled computer system so that the computer readable code is stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As such, according to the present invention, a position error which may occur when the step motor is driven in the micro step method can be removed. In addition, the position of the step motor can be highly precisely controlled even without a separate sensor.

What is claimed is:

1. A method for compensating for a position error of a step motor, comprising:
   sequentially inputting a predetermined number of a pulse as a rotator position command to a step motor driver;
   driving the step motor in a micro step method based on the rotator position command and a predetermined current command table;
   detecting an actual position of a rotator of the step motor while the step motor is being driven;
   calculating a position error by comparing the rotator position command and the detected actual position of the rotator; and
   compensating for the predetermined current command table based on the calculated position error,
   wherein the compensated current command table is obtained by Equation:

$$\overline{f}[k] = f[k] - \frac{f[k]-f[k-1]}{\theta[k]-\theta[k-1]}\Delta\theta[k], \quad k=1,2,\ldots,M$$

$$\overline{g}[k] = g[k] - \frac{g[k]-g[k-1]}{\theta[k]-\theta[k-1]}\Delta\theta[k], \quad k=1,2,\ldots,M$$

where $\overline{f}[k]$ and $\overline{g}[k]$ are current command data which are included in the compensated current command table, $f[k]$ and $g[k]$ are current command data which are included in the current command table before the compensation, $\theta[k]$ is the actual position of the rotator, $\Delta\theta[k]$ is the calculated position error, and M is the number of micro steps corresponding to one cycle of an electrical angle of the step motor.

2. The method of claim 1, wherein the current command table has the current command data for rotating the step motor at divided M micro steps, and the predetermined number of the pulses are more than or equal to the number M.

3. A system for compensating for a position error of a step motor, the system comprising:
   an encoder which detects an actual position of a rotator of the step motor while a step motor driver which is sequentially inputted with a predetermined number of a pulse as a rotator position command drives the step motor in a micro step method based on a predetermined current command table; and
   a compensator which calculates a position error by comparing the detected actual position of the rotator and a position command to which the rotator of the step motor moves according to the predetermined current command table and compensating for the predetermined current command table using the calculated position errors,
   wherein the compensated current command table is obtained by Equation:

$$\overline{f}[k] = f[k] - \frac{f[k]-f[k-1]}{\theta[k]-\theta[k-1]}\Delta\theta[k], \quad k=1,2,\ldots,M$$

$$\overline{g}[k] = g[k] - \frac{g[k]-g[k-1]}{\theta[k]-\theta[k-1]}\Delta\theta[k], \quad k=1,2,\ldots,M$$

where $\overline{f}[k]$ and $\overline{g}[k]$ are current command data which are included in the compensated current command table, $f[k]$ and $g[k]$ are current command data which are included in the current command table before the compensation, $\theta[k]$ is the actual position of the rotator, $\Delta\theta[k]$ is the calculated position error, and M is the number of micro steps corresponding to one cycle of an electrical angle of the step motor.

4. The system of claim 3, further comprising a motion controller which inputs the rotator position command to the step motor driver.

5. The system of claim 3, wherein the current command table has the current command data for rotating the step motor at divided M micro steps, and the predetermined number of the pulses are more than or equal to the number M.

6. A step motor system comprising:

a step motor; and a step motor driver which stores a first current command table and drives the step motor in a micro step method based on the first current command table at every time when an input pulse is inputted from an outside as a rotator position command, wherein the first current command table is obtained by compensating for a second current command table using a position error which is calculated by comparing an actual position of a rotator of the step motor and the rotator position command while the step motor driver which is sequentially inputted with a predetermined number of pulses as the rotator position command drives the step motor in the micro step method based on the second current command table, and the first current command table is obtained from Equation:

$$\overline{f}[k] = f[k] - \frac{f[k] - f[k-1]}{\theta[k] - \theta[k-1]}\Delta\theta[k], \quad k = 1, 2, \ldots, M$$

$$\overline{g}[k] = g[k] - \frac{g[k] - g[k-1]}{\theta[k] - \theta[k-1]}\Delta\theta[k], \quad k = 1, 2, \ldots, M$$

where $\overline{f}[k]$ and $\overline{g}[k]$ are current command data which are included in the first current command table, f[k] and g[k] are current command data which are included in the second current command table, $\theta[k]$ is the actual position of the rotator, $\Delta\theta[k]$ is the calculated position error, and M is the number of micro steps corresponding to one cycle of an electrical angle of the step motor.

7. The system of claim 6, wherein the first and the second current command tables respectively have a first current command data and a second current command data for rotating the step motor at divided M micro steps, and the predetermined number of the pulses are more than or equal to the number M.

* * * * *